(12) United States Patent (10) Patent No.: US 8,644,018 B2
Hung (45) Date of Patent: Feb. 4, 2014

(54) HINGE DEVICE AND DOCKING STATION USING THE SAME

(75) Inventor: Shih-Wei Hung, Taipei (TW)

(73) Assignee: Pegatron Corporation, Taipei (TW)

( * ) Notice: Subject to any disclaimer, the term of this patent is extended or adjusted under 35 U.S.C. 154(b) by 197 days.

(21) Appl. No.: 13/399,022

(22) Filed: Feb. 17, 2012

(65) Prior Publication Data

US 2012/0212900 A1 Aug. 23, 2012

(30) Foreign Application Priority Data

Feb. 23, 2011 (TW) .............................. 100106041 A (51) Int. Cl.
*G06F 1/16* (2006.01)
(52) U.S. Cl.
USPC .................... 361/679.41; 710/303; 16/302
(58) Field of Classification Search
USPC ........... 361/679.41, 679.43; 16/302; 710/303, 710/304
See application file for complete search history.

(56) References Cited

U.S. PATENT DOCUMENTS

| | | | |
|---|---|---|---|
| 6,108,200 A * | 8/2000 | Fullerton ................. | 361/679.12 |
| 6,937,468 B2 * | 8/2005 | Lin et al. .................. | 361/679.41 |
| 7,139,168 B2 | 11/2006 | DeLuga et al. | |
| 7,599,178 B2 * | 10/2009 | Huang et al. ............. | 361/679.43 |
| 7,810,222 B2 * | 10/2010 | Ward et al. ................ | 29/410 |
| 8,077,454 B2 * | 12/2011 | Ward et al. ............... | 361/679.41 |
| 8,223,483 B2 * | 7/2012 | Hayashida et al. ...... | 361/679.41 |
| 2003/0095380 A1 * | 5/2003 | Chen et al. .................... | 361/686 |
| 2009/0213536 A1 * | 8/2009 | Lewandowski et al. .. | 361/679.43 |
| 2012/0293949 A1 * | 11/2012 | Zhou ........................ | 361/679.41 |

FOREIGN PATENT DOCUMENTS

CN 201725243 U 1/2011

OTHER PUBLICATIONS

English translation of abstract of CN 1219243.
English translation of abstract of CN 2638401 (published Sep. 1, 2004).
English translation of abstract of CN 201725243 (published Jan. 26, 2011).
Full text English translation (machine translation) of CN 201725243 (published Jan. 26, 2011).

\* cited by examiner

*Primary Examiner* — Lisa Lea Edmonds
(74) *Attorney, Agent, or Firm* — McClure, Qualey & Rodack, LLP (57) ABSTRACT

The disclosure provides a hinge device for installing a tablet computer and disposed at a base having a fixing hole. The hinge device includes a casing, an elastic element, a fixing pin, and a lifting pin. The casing is pivotally connected with the base thus to be capable of rotating relative to the base, and it has a through hole corresponding to the fixing hole. The elastic element and the fixing pin are disposed in the casing. The fixing pin has a first inclined surface. One end of the fixing pin is connected with the elastic element, and the other end corresponds to the through hole. The lifting pin is moveably disposed through and protrudes from the casing, and the lifting pin has a second inclined surface against the first inclined surface. A docking station using the aforementioned hinge device is also disclosed.

7 Claims, 9 Drawing Sheets

HINGE DEVICE AND DOCKING STATION USING THE SAME

CROSS-REFERENCE TO RELATED APPLICATIONS

This Non-provisional application claims priority under 35 U.S.C. §119(a) on Patent Application No(s). 100106041 filed in Taiwan, Republic of China on Feb. 23, 2011, the entire contents of which are hereby incorporated by reference.

BACKGROUND

1. Technology Field

This disclosure relates to a hinge device and a docking station using the same and, more particularly, to a hinge device and a docking station using the same for a tablet computer.

2. Description of the Related Art

To make a conventional tablet computer or a miniature digital display device light and slim, it is operated by a touching display device and a material keyboard or a base is not needed. When a user operates the tablet computer or the miniature digital display device, he or she has to hold it by hand or place it on the thigh or table. For a short-time operation, the effect may be week. However, for a long-time operation, it may increase the user's burden or easily make the user tired.

Accordingly, a simple supporting base is provided for supporting the tablet computer or the miniature digital display device. When the tablet computer or the miniature digital display device is supported on the supporting base, it can be tilted relative to the table for a certain angle, thus facilitating viewing of the user or others. Further, the user need not hold it by hand for a long time.

However, it is not safe enough that the tablet computer or the miniature digital display device is just supported on the supporting base. If someone strikes the tablet computer uncarefully, the tablet computer may fall thus to be damaged.

SUMMARY

Accordingly, the embodiment of the invention provides a hinge device disposed at a base having a fixing hole and used for installing a tablet computer. The hinge device includes a casing, an elastic element, a fixing pin, and a lifting pin. The casing is pivotally connected with the base thus to be capable of rotating relative to the base, and the casing has a through hole corresponding to the fixing hole. The elastic element and the fixing pin are disposed in the casing. The fixing pin has a first inclined surface. One end of the fixing pin is connected with the elastic element, and the other end of the fixing pin corresponds to the through hole. The lifting pin is moveably disposed through and protrudes from the casing. The lifting pin has a second inclined surface against the first inclined surface. When the tablet computer is installed at the hinge device and presses the lifting pin to move, the second inclined surface pushes the first inclined surface, allowing the other end of the fixing pin to protrude from the through hole thus to enter the fixing hole and to allow the elastic element to deform to store an elastic potential energy. When the tablet computer is separated from the hinge device, the elastic potential energy is released to allow the first inclined surface to push the second inclined surface, thus restoring the lifting pin and the fixing pin to a respective original location.

The embodiment of the invention also provides a docking station including a base and a hinge device. The base has a fixing hole. The hinge device includes a casing, an elastic element, a fixing pin, and a lifting pin. The casing is pivotally connected with the base thus to be capable of rotating relative to the base, and the casing has a through hole corresponding to the fixing hole. The elastic element and the fixing pin are disposed in the casing. The fixing pin has a first inclined surface. One end of the fixing pin is connected with the elastic element, and the other end of the fixing pin corresponds to the through hole. The lifting pin is moveably disposed through and protrudes from the casing, and the lifting pin has a second inclined surface against the first inclined surface. When the tablet computer is installed at the hinge device and presses the lifting pin to move, the second inclined surface pushes the first inclined surface, allowing the other end of the fixing pin to protrude from the through hole thus to enter the fixing hole and to allow the elastic element to deform to store an elastic potential energy. When the tablet computer is separated from the hinge device, the elastic potential energy is released to allow the first inclined surface to push the second inclined surface, thus restoring the lifting pin and the fixing pin to a respective original location.

To sum up, the embodiment of the invention improves the prior art, allowing the tablet computer not to fall easily.

These and other features, aspects, and advantages of the present invention will become better understood with regard to the following description, appended claims, and accompanying drawings.

DETAILED DESCRIPTION OF THE INVENTION

Figure 1:
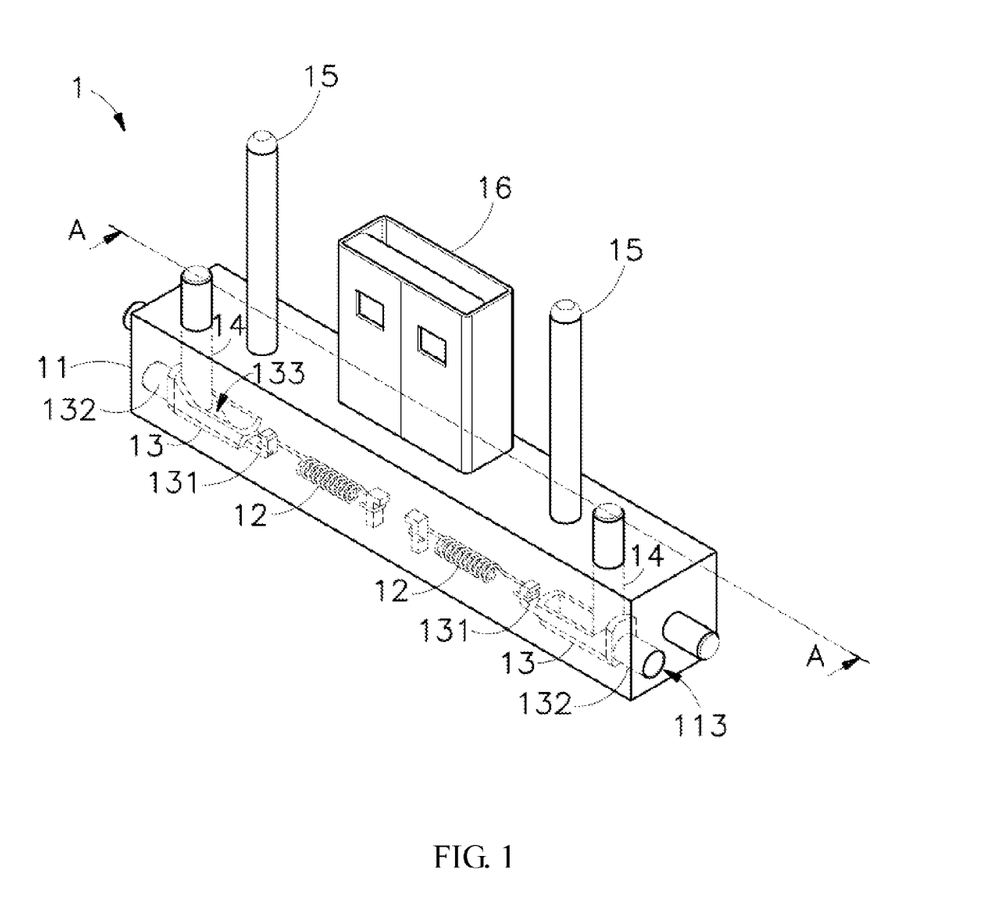
FIG. 1 is a first schematic diagram showing a hinge device according to one embodiment of the invention.
Figure 2:
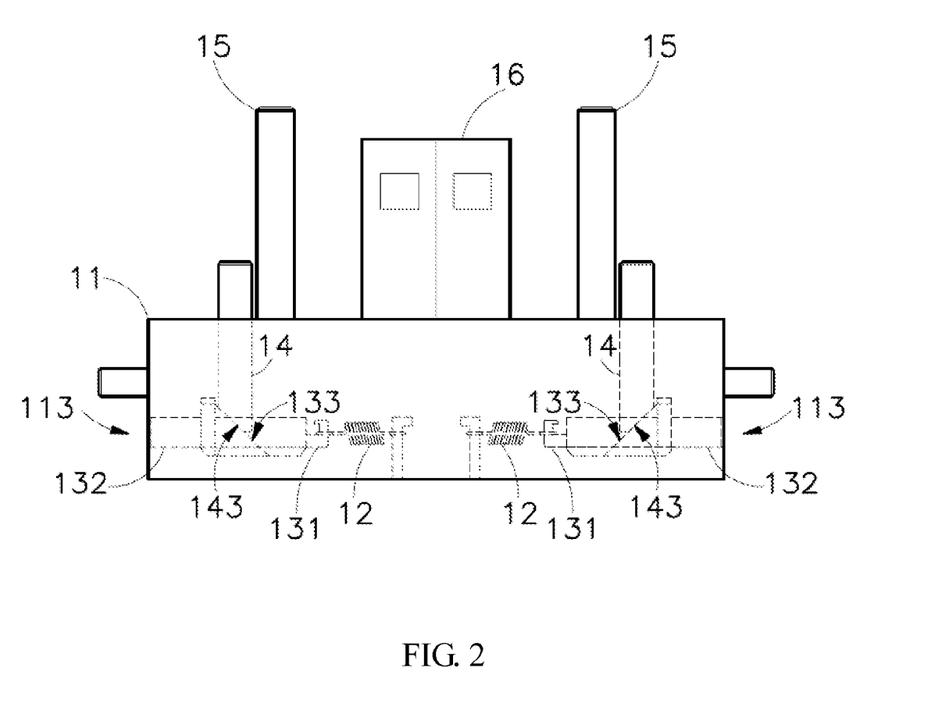
FIG. 2 is a cross-section diagram along an AA line in FIG. 1.
Figure 3:
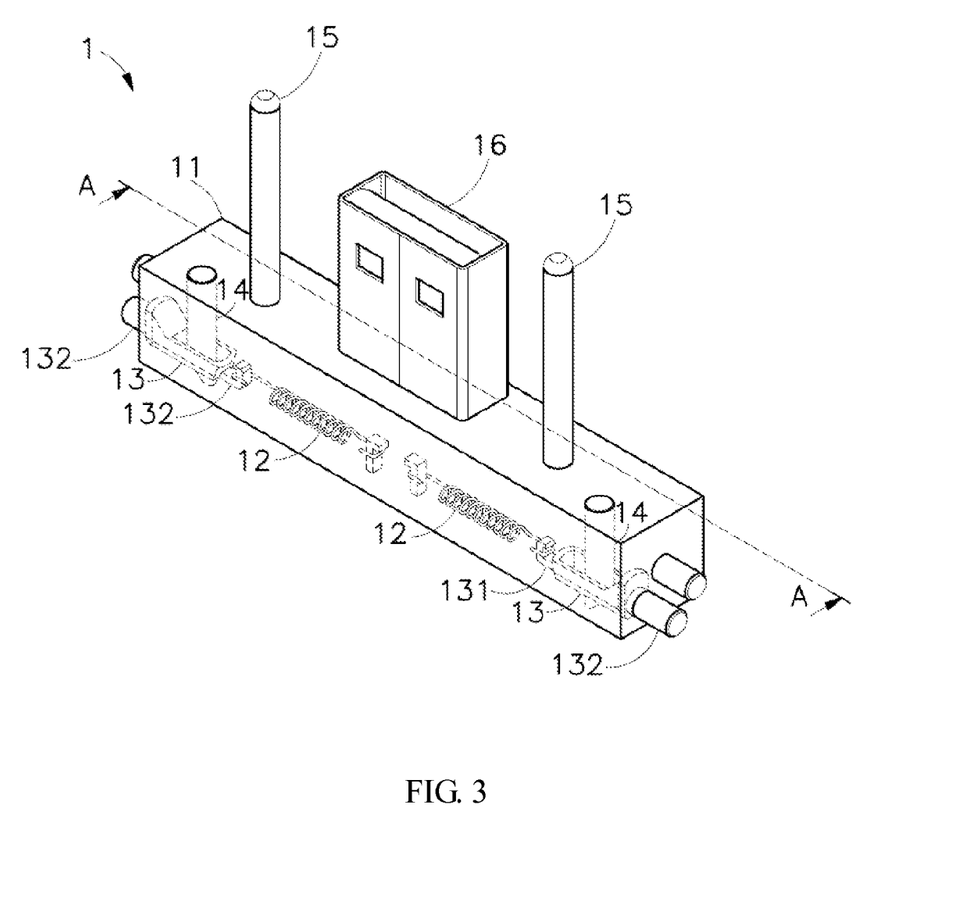
FIG. 3 is a second schematic diagram showing a hinge device according to one embodiment of the invention.
Figure 4:
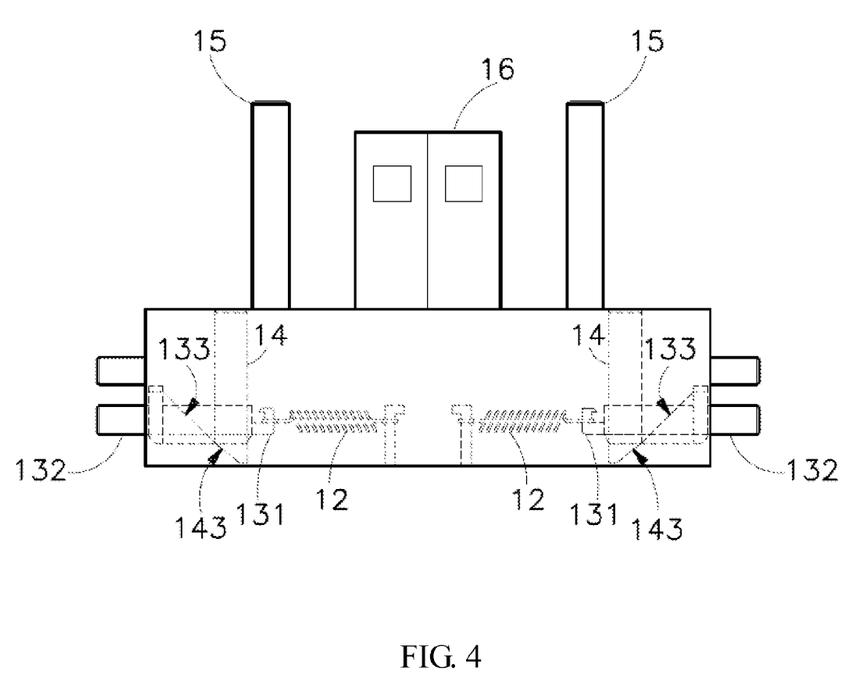
FIG. 4 is a cross-section diagram along an AA line in FIG. 3.
Figure 5:
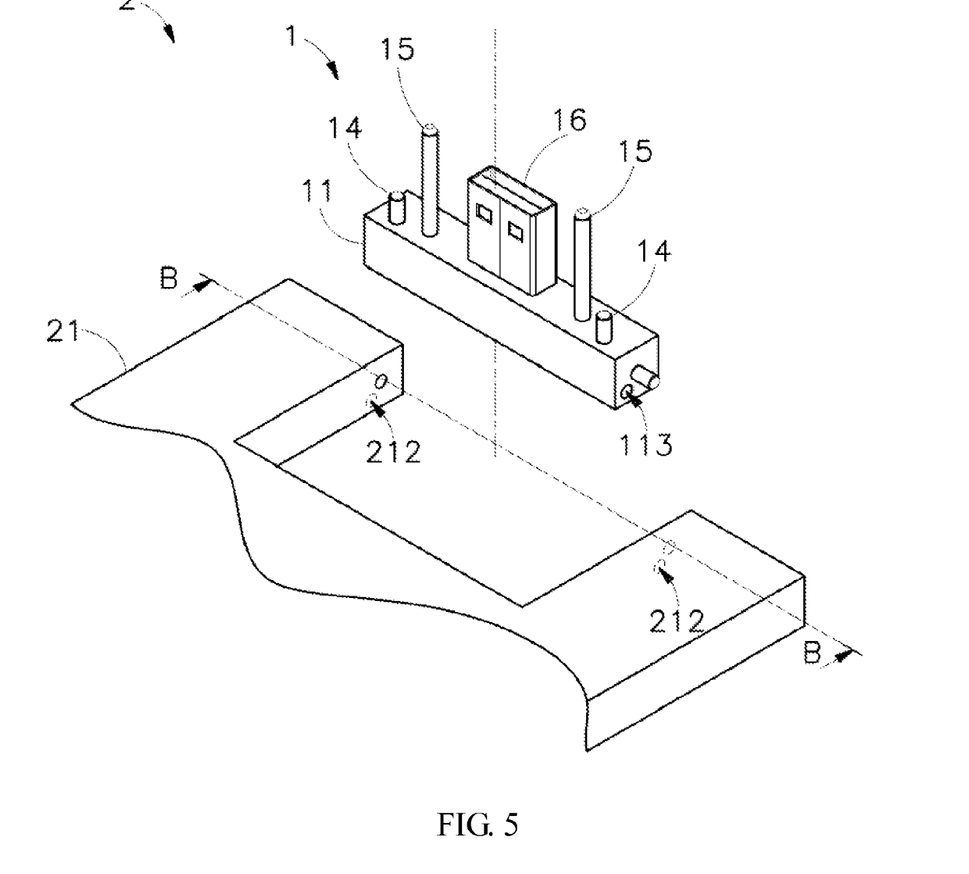
FIG. 5 is a schematic diagram showing a docking station according to one embodiment of the invention.

FIG. 1 is a first schematic diagram showing a hinge device according to one embodiment of the invention; FIG. 2 is a cross-section diagram along an AA line in FIG. 1; FIG. 3 is a second schematic diagram showing a hinge device according to one embodiment of the invention; FIG. 4 is a cross-section diagram along an AA line in FIG. 3; FIG. 5 is a schematic diagram showing a docking station according to one embodiment of the invention. Please refer to FIGS. 1 through 5. A hinge device 1 is used for being connected with a tablet computer 3, and the hinge device 1 is disposed at a base 21 having a fixing hole 212. The hinge device 1 includes a casing 11, an elastic element 12, a fixing pin 13, and a lifting pin 14. The casing 11 is pivotally connected with the base 21 thus to be capable of rotating relative to the base 21. The casing 11 has a through hole 113 corresponding to the fixing hole 212.

The elastic element 12 and the fixing pin 13 are disposed in the casing 11. The fixing pin 13 has a first inclined surface 133. A first end 131 of the fixing pin 13 is connected with the elastic element 12, and a second end 132 corresponds to the through hole 113. The first inclined surface 133 is between the first end 131 and the second end 132. The lifting pin 14 is moveably disposed through and protrudes from the casing 11, and the lifting pin 14 has a second inclined surface 143 against the first inclined surface 133. When the tablet computer 3 is not installed at the hinge device 1, the lifting pin 14 protrudes from the casing 11.

When the tablet computer 3 is installed at the hinge device 1 and presses the lifting pin 14 to move, the second inclined surface 143 pushes the first inclined surface 133, allowing the fixing pin 13 to protrude from the through hole 113 of the casing 11 thus to enter the fixing hole 212 of the base 21 and to allow the elastic element 12 to deform to store an elastic potential energy. When the tablet computer 3 is separated from the hinge device 1, the elastic potential energy of the elastic element 12 is released to allow the first inclined surface 133 to push the second inclined surface 143, thus restoring the lifting pin 14 and the fixing pin 13 to a respective original location.

Further, the hinge device 1 may include a plurality of guide pins 15 disposed at a surface of the casing 11 and parallel to the lifting pin 14. When the tablet computer 3 is installed at the hinge device 1, the guide pins 15 can enter the bottom of the tablet computer 3 to allow the tablet computer 3 to be firmly connected with the hinge device 1.

The hinge device 1 may further include an electric connector 16. The electric connector 16 may be a USB connector disposed at the surface of the casing 11 to be electrically connected with the tablet computer 3.

Figure 6:
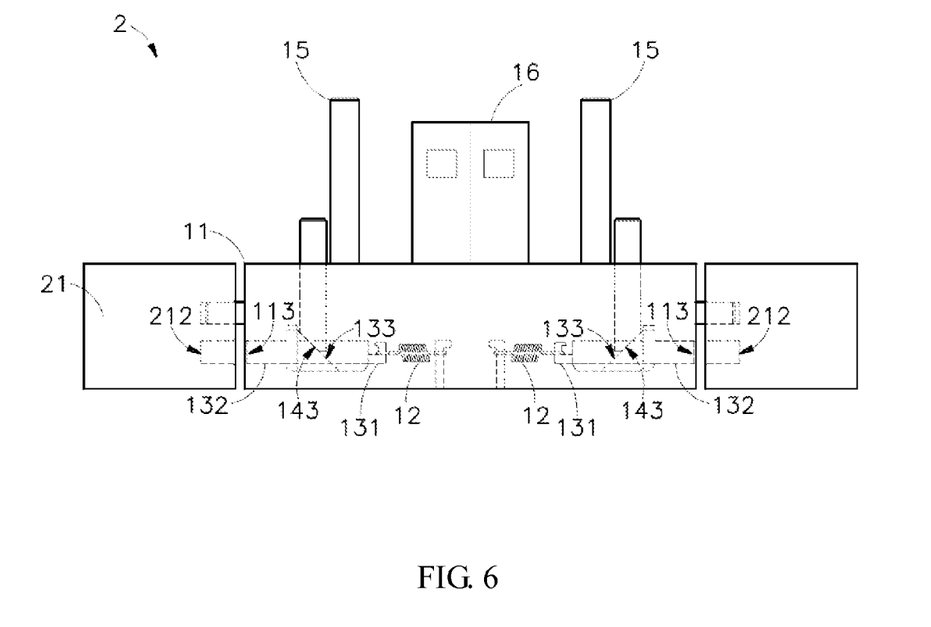
FIG. 6 is a cross-section diagram along a BB line in FIG. 5.

FIG. 5 is a schematic diagram showing a docking station according to one embodiment of the invention; FIG. 6 is a cross-section diagram along a BB line in FIG. 5. Please refer to FIG. 5 and FIG. 6. A docking station 2 includes a base 21 and a hinge device 1 for being connected with a tablet computer 3. The base 21 has a fixing hole 212. The hinge device 1 includes a casing 11, an elastic element 12, a fixing pin 13, and a lifting pin 14. The casing 11 is pivotally connected with the base 21 thus to be capable of rotating relative to the base 21, and the casing 11 has a through hole 113 corresponding to the fixing hole 212. The elastic element 12 and the fixing pin 13 are disposed in the casing 11. The fixing pin 13 has a first inclined surface 133. A first end 131 of the fixing pin 13 is connected with the elastic element 12, and a second end 132 corresponds to the through hole 113. The first inclined surface 133 is between the first end 131 and the second end 132. The lifting pin 14 is movably disposed through and protrudes from the casing 11, and the lifting pin 14 has a second inclined surface 143 against the first inclined surface 133. When the tablet computer 3 is not installed at the hinge device 1, the lifting pin 14 protrudes from the casing 11.

Figure 7:
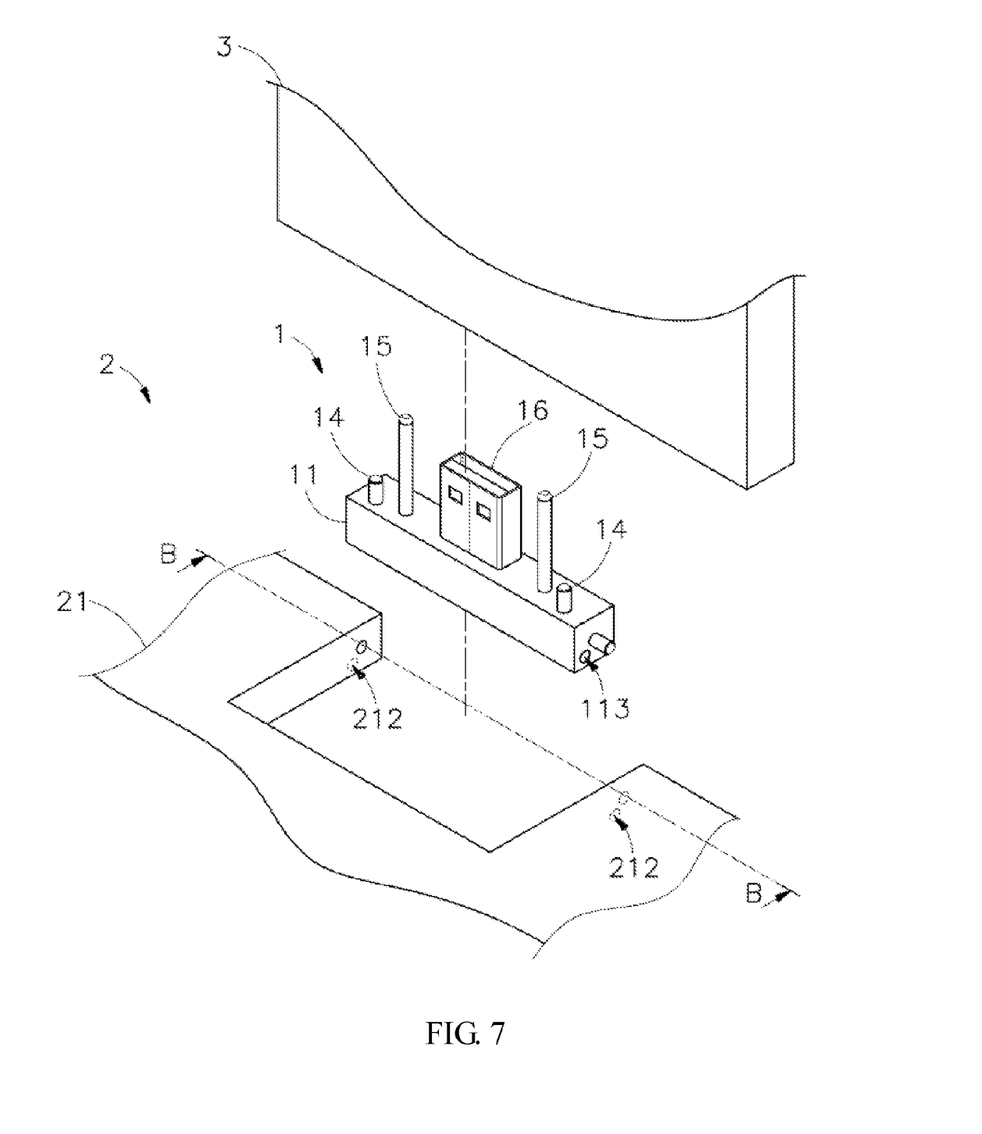
FIG. 7 is a first schematic diagram showing that a tablet computer is disposed at a docking station according to one embodiment of the invention.
Figure 8:
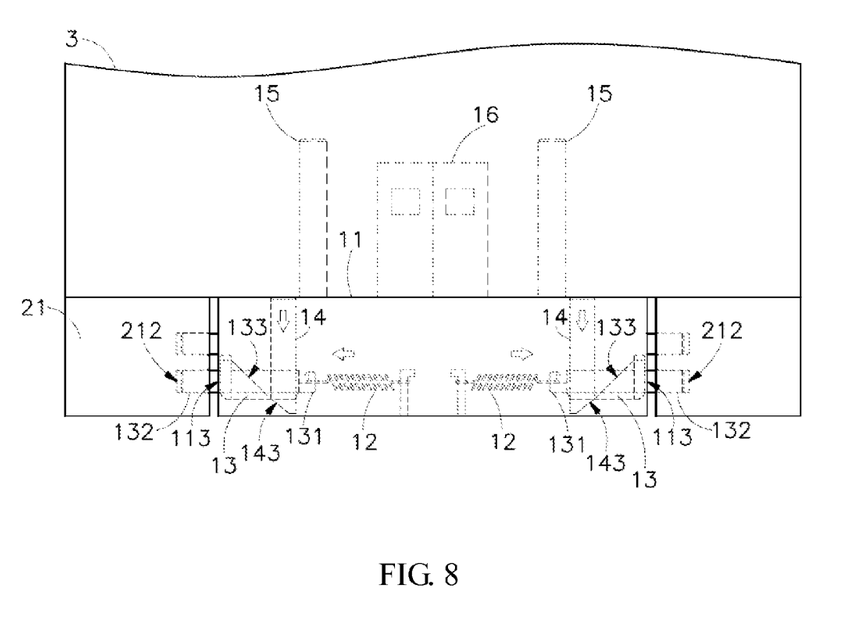
FIG. 8 is a cross-section diagram along a BB line in FIG. 7.

FIG. 7 is a first schematic diagram showing that a tablet computer is disposed at a docking station according to one embodiment of the invention; FIG. 8 is a cross-section diagram along a BB line in FIG. 7. Please refer to FIG. 7 and FIG. 8. The docking station 2 may include a plurality of guide pins 15 disposed at a surface of the casing 11 and parallel to the lifting pin 14. When the hinge device 1 of the docking station 2 is connected with the tablet computer 3, the guide pins 15 can enter the bottom of the tablet computer 3 to allow the tablet computer 3 to be firmly connected with the docking station 2.

Please refer to FIG. 7 and FIG. 8 again. The docking station 2 may further include an electric connector 16, such as a USB connector, disposed at the surface of the casing 11 to be electrically connected with the tablet computer 3, allowing the tablet computer 3 to expand functions via the docking station 2.

Figure 9:
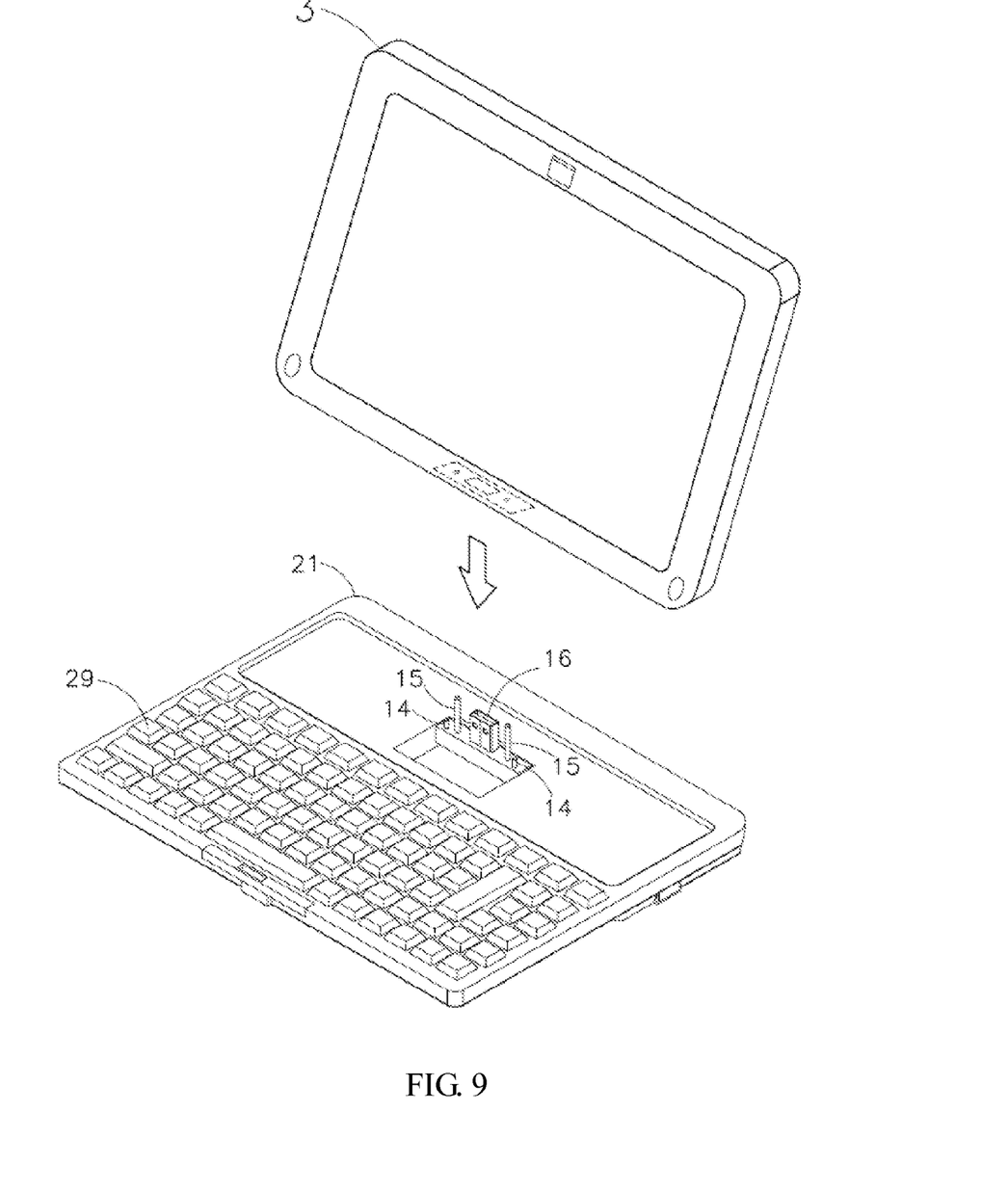
FIG. 9 is a second schematic diagram showing that a tablet computer is disposed at a docking station according to one embodiment of the invention.

FIG. 9 is a second schematic diagram showing that a tablet computer is disposed at a docking station according to one embodiment of the invention. Please refer to FIG. 9. When the tablet computer 3 is disposed at the docking station 2, the tablet computer 3 may press the lifting pin 14 to move via gravity. At that moment, the second inclined surface 143 pushes the first inclined surface 133 to allow the fixing pin 13 to protrude from the through hole 113 of the casing 11 thus to enter the fixing hole 212 of the base 21. The casing 11 may fail to rotate relative to the base 21 due to the limitation of the fixing pin 13, and therefore the tablet computer 3 may not fall to be damaged even if it is struck uncarefully by an external force.

Further, since the tablet computer 3 is mainly operated by a touching method, the docking station 2 may further have a keyboard 29 disposed in the base 21, and the keyboard 29 is electrically connected with the electric connector 16. When the tablet computer 3 is disposed at the docking station 2, the user can operate the tablet computer 3 or input data via the keyboard 29.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A hinge device disposed at a base having a fixing hole and used for installing a tablet computer, comprising:
   a casing pivotally connected with the base thus to be capable of rotating relative to the base, the casing having a through hole corresponding to the fixing hole;
   an elastic element disposed in the casing;
   a fixing pin disposed in the casing, the fixing pin having a first inclined surface, one end of the fixing pin being connected with the elastic element, the other end of the fixing pin corresponding to the through hole; and
   a lifting pin moveably disposed through and protruding from the casing, the lifting pin having a second inclined surface against the first inclined surface;
   wherein when the tablet computer is installed at the hinge device and presses the lifting pin to move, the second inclined surface pushes the first inclined surface, allowing the other end of the fixing pin to protrude from the through hole thus to enter the fixing hole and to allow the elastic element to deform to store an elastic potential energy, and when the tablet computer is separated from the docking station, the elastic potential energy is released to allow the first inclined surface to push the second inclined surface, thus restoring the lifting pin and the fixing pin to a respective original location.

2. The hinge device according to claim 1, further comprising a plurality of guide pins disposed at a surface of the casing and parallel to the lifting pin.

3. The hinge device according to claim 1, further comprising an electric connector disposed at a surface of the casing to be electrically connected with the tablet computer.

4. A docking station comprising:
a base having a fixing hole; and
a hinge device for installing a tablet computer, including:
- a casing pivotally connected with the base thus to be capable of rotating relative to the base, the casing having a through hole corresponding to the fixing hole;
- an elastic element disposed in the casing;
- a fixing pin disposed in the casing, the fixing pin having a first inclined surface, one end of the fixing pin being connected with the elastic element, the other end of the fixing pin corresponding to the through hole; and
- a lifting pin moveably disposed through and protruding from the casing, the lifting pin having a second inclined surface against the first inclined surface;

wherein when the tablet computer is installed at the hinge device and presses the lifting pin to move, the second inclined surface pushes the first inclined surface, allowing the other end of the fixing pin to protrude from the through hole thus to enter the fixing hole and to allow the elastic element to deform to store an elastic potential energy, and when the tablet computer is separated from the docking station, the elastic potential energy is released to allow the first inclined surface to push the second inclined surface, thus restoring the lifting pin and the fixing pin to a respective original location.

5. The docking station according to claim 4, further comprising a plurality of guide pins disposed at a surface of the casing and parallel to the lifting pin.

6. The docking station according to claim 4, further comprising an electric connector disposed at a surface of the casing to be electrically connected with the tablet computer.

7. The docking station according to claim 6, further comprising a keyboard disposed at the base and electrically connected with the electric connector.

* * * * *